(12) United States Patent
Lambert et al.

(10) Patent No.: US 11,429,723 B2
(45) Date of Patent: Aug. 30, 2022

(54) MULTI-DOMAIN BOOT AND RUNTIME STATUS CODE DRIFT DETECTION

(71) Applicant: Dell Products L.P., Round Rock, TX (US)

(72) Inventors: Timothy M. Lambert, Austin, TX (US); Michael J. Stumpf, Cedar Park, TX (US); Jeffrey L. Kennedy, Austin, TX (US); Nihit S. Bhavsar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/113,372

(22) Filed: Dec. 7, 2020

(65) Prior Publication Data
US 2022/0179962 A1    Jun. 9, 2022

(51) Int. Cl.
*G06F 21/57* (2013.01)
*G06F 15/177* (2006.01)
*G06F 11/22* (2006.01)

(52) U.S. Cl.
CPC ........ *G06F 21/575* (2013.01); *G06F 11/2284* (2013.01); *G06F 15/177* (2013.01)

(58) Field of Classification Search
CPC ... G06F 21/575; G06F 11/2284; G06F 15/177
See application file for complete search history.

(56) References Cited

U.S. PATENT DOCUMENTS

| | | | |
|---|---|---|---|
| 2018/0053004 A1* | 2/2018 | Rahardjo | G06F 21/74 |
| 2018/0285121 A1* | 10/2018 | Lambert | G06F 9/4405 |
| 2018/0300202 A1* | 10/2018 | Lambert | G06F 9/4405 |
| 2019/0045358 A1* | 2/2019 | Ahmed | H04W 12/06 |
| 2021/0194699 A1* | 6/2021 | Tatonetti | H04N 5/77 |

* cited by examiner

*Primary Examiner* — Zahid Choudhury
(74) *Attorney, Agent, or Firm* — Jackson Walker L.L.P.

(57) ABSTRACT

A method may include, during a first initial boot of a management controller, writing baseline processor domain status information associated with boot of each of a main processor and a second processor of the management controller to a baseline queue, and during each subsequent boot of the management controller, writing run-time processor domain status information associated with boot of each of the main processor and the second processor to a run-time queue, determining if a deviation exists between the run-time queue and the baseline queue, and responsive to the deviation existing between the run-time queue and the baseline queue, taking one or more responsive actions.

24 Claims, 3 Drawing Sheets

MULTI-DOMAIN BOOT AND RUNTIME STATUS CODE DRIFT DETECTION

TECHNICAL FIELD

The present disclosure relates in general to information handling systems, and more particularly to methods and systems for detecting boot and runtime status code drift across multiple domains of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many consumers of information handling resources are increasingly demanding that manufacturers of information handling systems provide verifiable assurances that an information handling system ordered from the manufacturer has not been tampered with prior to receipt by the customer, or after delivery by a malicious entity. For example, without security measures in place, an interloper (e.g., a government intelligence agency, business competitor, or other person with harmful intent) could possibly intercept an information handling system during transit, and replace hardware and software components of the information handling system with malicious components intended to mimic the replaced components while performing some malicious operation (e.g., snooping data, data corruption, or communications of the information handling system). While many approaches have been employed (e.g., Trusted Platform Module) to ensure security of software during transit from manufacturer to intended end user, the industry still lacks an effective approach for providing such security with respect to hardware components.

SUMMARY

In accordance with the teachings of the present disclosure, the disadvantages and problems associated with ensuring security of an information handling system may be reduced or eliminated.

In accordance with embodiments of the present disclosure, an information handling system may include a host system comprising a host system processor and a management controller communicatively coupled to the host system processor and comprising a main processor configured for implementing functionality of the management controller and a second processor communicatively coupled to the main processor and configured for implementing additional functionality of the management controller. The management controller may be configured to, during a first initial boot of the management controller, write baseline processor domain status information associated with boot of each of the main processor and the second processor to a baseline queue, and during each subsequent boot of the management controller write run-time processor domain status information associated with boot of each of the main processor and the second processor to a run-time queue, determine if a deviation exists between the run-time queue and the baseline queue, and responsive to the deviation existing between the run-time queue and the baseline queue, take one or more responsive actions.

In accordance with these and other embodiments of the present disclosure, a method may be provided in an information handling system comprising a host system comprising a host system processor, the information handling system further comprising a management controller communicatively coupled to the host system processor and having a main processor and configured for implementing functionality of the management controller and a second processor communicatively coupled to the main processor and configured for implementing additional functionality of the management controller. The method may include, during a first initial boot of the management controller, writing baseline processor domain status information associated with boot of each of the main processor and the second processor to a baseline queue, and during each subsequent boot of the management controller, writing run-time processor domain status information associated with boot of each of the main processor and the second processor to a run-time queue, determining if a deviation exists between the run-time queue and the baseline queue, and responsive to the deviation existing between the run-time queue and the baseline queue, taking one or more responsive actions.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in an information handling system comprising a host system comprising a host system processor, the information handling system further comprising a management controller communicatively coupled to the host system processor and having a main processor and configured for implementing functionality of the management controller and a second processor communicatively coupled to the main processor and configured for implementing additional functionality of the management controller: during a first initial boot of the management controller, write baseline processor domain status information associated with boot of each of the main processor and the second processor to a baseline queue; and during each subsequent boot of the management controller: write run-time processor domain status information associated with boot of each of the main processor and the second processor to a run-time queue; determine if a deviation exists between the run-time queue and the baseline queue; and responsive to the deviation existing between the run-time queue and the baseline queue, take one or more responsive actions.

Technical advantages of the present disclosure may be readily apparent to one skilled in the art from FIG. 1s, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
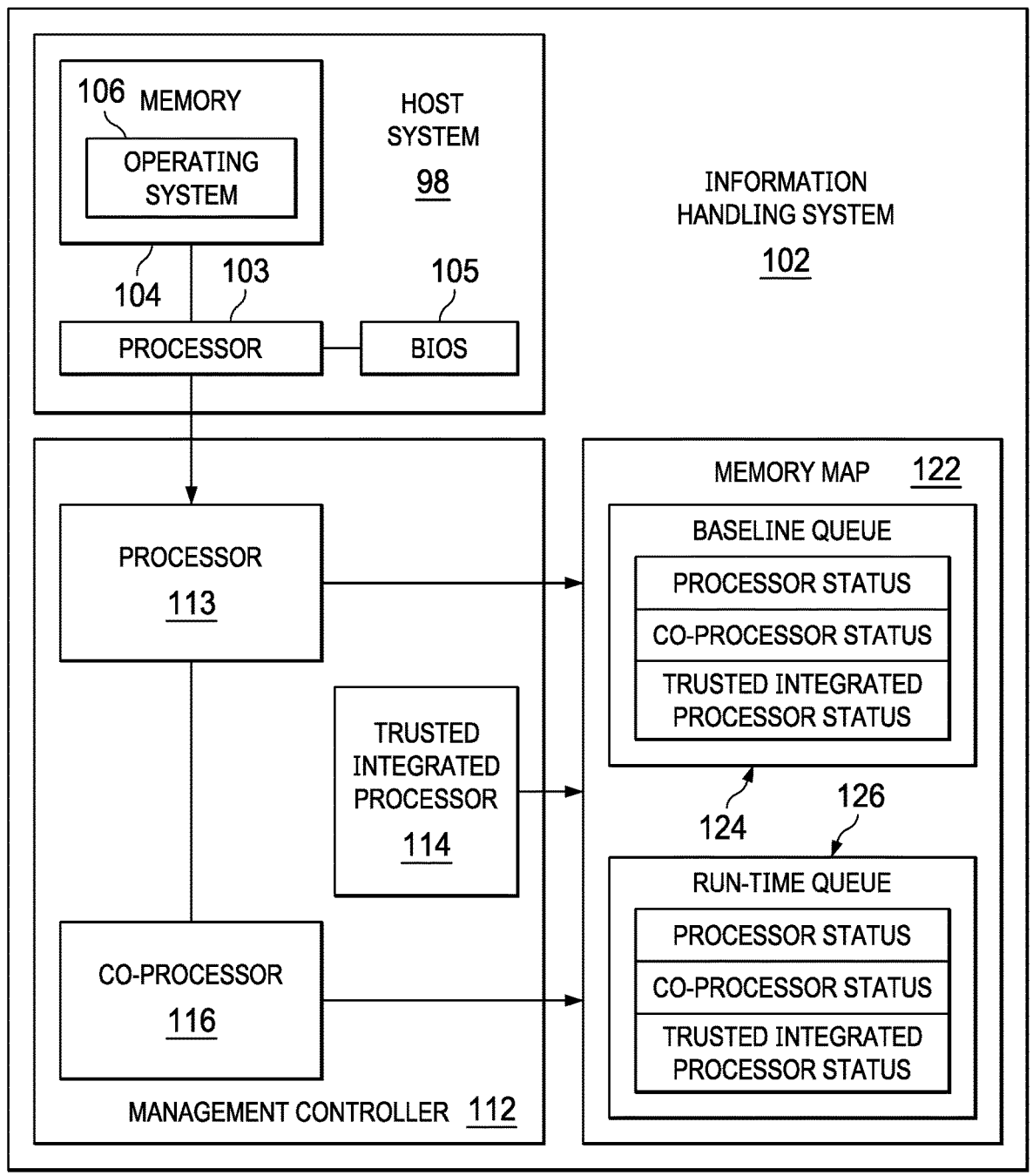
FIG. 1 illustrates a block diagram of an example information handling system, in accordance with embodiments of the present disclosure.
Figure 2:
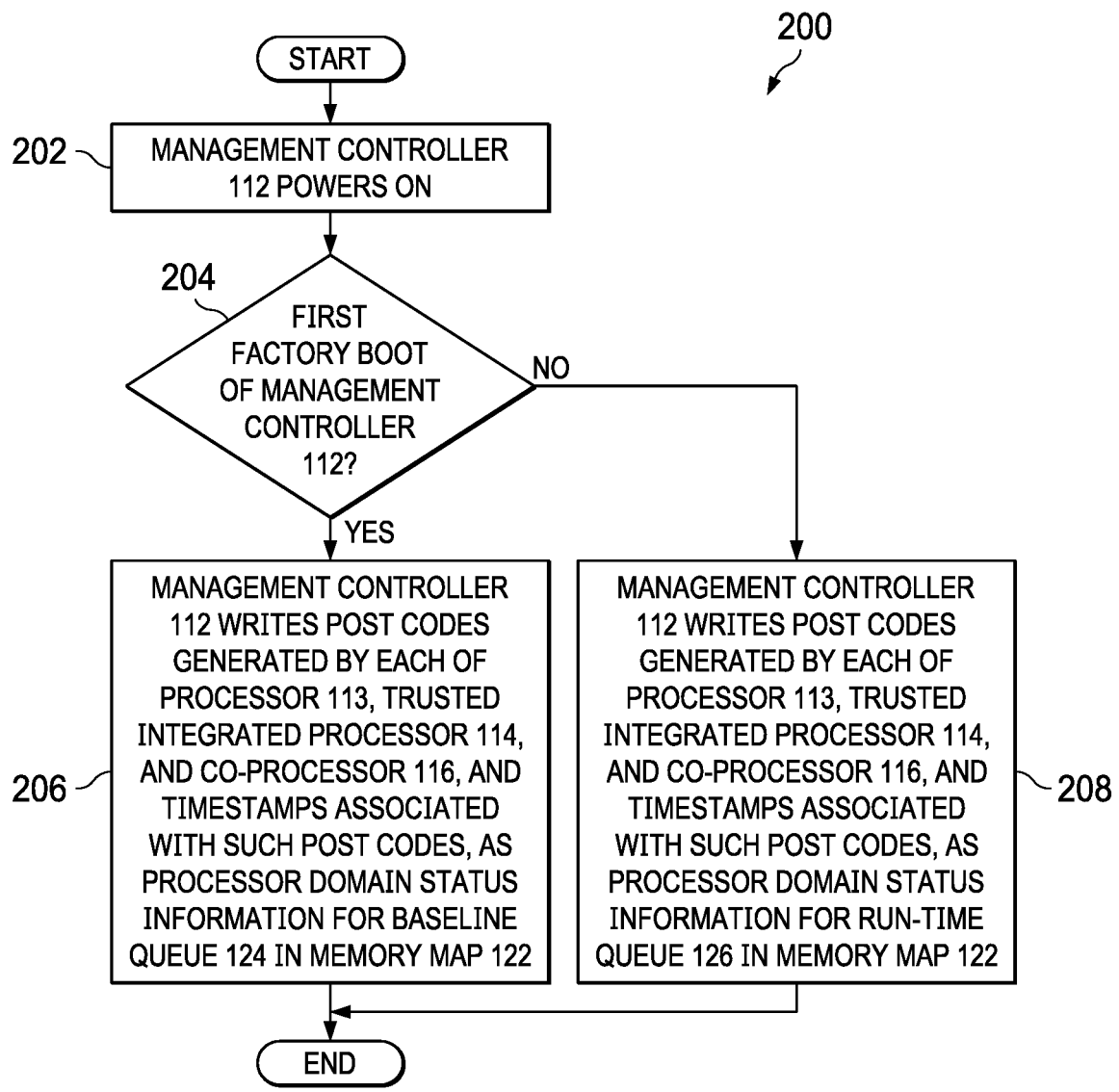
FIG. 2 illustrates a flow chart of a method for creating status queues for processing domains of a management controller, in accordance with embodiments of the present disclosure.
Figure 3:
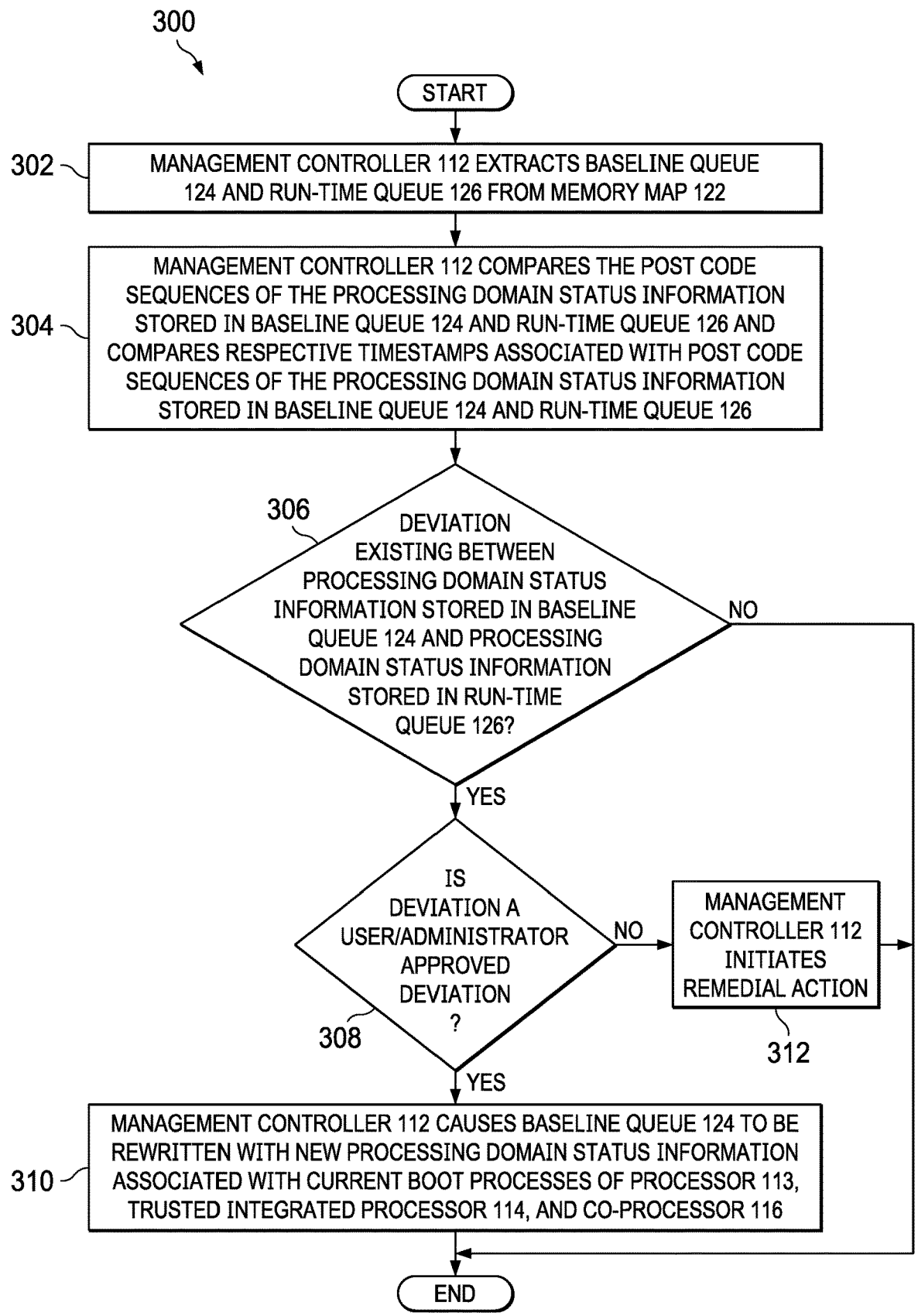
FIG. 3 illustrates a flow chart of a method for analyzing status queues of processing domains of a management controller, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 112 communicatively coupled to processor 103, and a memory map 122 communicatively coupled to management controller 112. In operation, processor 103, memory 104, and BIOS 105 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide management facilities for management of information handling system 102. Such management may be made by management controller 112 even if information handling system 102 is powered off or powered to a standby state. Management controller 112 may include a processor 113 communicatively coupled to processor 103, a trusted integrated processor 114 communicatively coupled to processor 113, and a co-processor 116 communicatively coupled to processor 113. In certain embodiments, management controller 112 may include or may be an integral part of a baseboard management controller (BMC) or a remote access controller (e.g., a Dell Remote Access Controller or Integrated Dell Remote Access Controller). In these and other embodiments, management controller 112 may be referred to as a service processor or access controller.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Such coupling may be via a Universal Serial Bus (USB), System Management Bus (SMBus), general purpose input/output (GPIO) channel and/or one or more other communications channels.

Trusted integrated processor 114 may comprise a crypto-processor or special co-processor configured to provide secured boot services and run-time security functions of management controller 112, including without limitation signature services, root of trust, external monitoring of a serial peripheral interface, secure handling of keys, and other functionality. In some embodiments, trusted integrated processor 114 may include a trusted platform module or similar device configured to carry out cryptographic operations on data communicated to it from processor 113 and/or another component of management controller 112.

Co-processor 116 may comprise a special-purpose processor used to supplement functionality of processor 113. For example, in some embodiments, co-processor 116 may comprise an input/output (I/O) processor for providing I/O operations with respect to other devices. In these and other embodiments, operations performed by co-processor 116 may include floating point arithmetic, graphics acceleration, signal processing, string processing, and/or encryption. Off-loading of specialized tasks from processor 113 to co-processor 116 may accelerate performance.

Memory map 122 may be embodied in a memory or other suitable non-transitory computer readable medium. For example, in some embodiments, memory map 122 may be implemented using a complex programmable logic device. As another example, memory map 122 may be implemented using embedded Multi-Media Controller (eMMC) memory. As shown in FIG. 1, memory map 122 may store a baseline queue 124 of processor domain status information and a run-time queue 126 of processor domain status information, as described in greater detail below.

Baseline queue 124 may store processor domain status information generated for a first boot for processor domains of each of processor 113, trusted integrated processor 114, and co-processor 116. As used herein "processor domain status information" may comprise information generated during a boot or other initialization of processor 113, trusted integrated processor 114, and co-processor 116. Such processor domain status information may include power-on/self-test (POST) codes generated during execution of boot code for each of processor 113, trusted integrated processor 114, and co-processor 116, as well as timestamps at which each such POST code is generated. As shown in FIG. 1, baseline queue 124 may include processor status information associated with boot code of processor 113 (e.g., bootblock, Uboot, operating system of management controller 112), co-processor status information associated with boot code of co-processor 116, and trusted integrated processor status information associated with boot code of trusted integrated processor 114. Accordingly, baseline queue 124 may, in a sense, store a signature or fingerprint associated with an initial, baseline boot of management controller 112. In some embodiments, baseline queue 124 may be written during factory provisioning of information handling system 102, such that any drift of processor domain status information from that set forth in baseline queue 124 may indicate modification to management controller 112 or information handling system 102 occurring in transit to a location of its intended end use as well as modification occurring while at the location of its intended end use.

Run-time queue 126 may store processor domain status information generated for each subsequent boot for processor domains of each of processor 113, trusted integrated processor 114, and co-processor 116. Similar to baseline queue 124, such processor domain status information stored in run-time queue 126 may include power-on/self-test (POST) codes generated during execution of boot code for each of processor 113, trusted integrated processor 114, and co-processor 116, as well as timestamps at which each such POST code is generated. As shown in FIG. 1, run-time queue 126 may include processor status information associated with boot code of processor 113 (e.g., bootblock, Uboot, operating system of management controller 112), co-processor status information associated with boot code of co-processor 116, and trusted integrated processor status information associated with boot code of trusted integrated processor 114. Accordingly, run-time queue 126 may, in a sense, store a signature or fingerprint associated with a boot of management controller 112 occurring at a location of its intended end use. Thus, as described in greater detail below, management controller 112 or another component of information handling system 102 may compare baseline queue 124 to run-time queue 126 to determine if modifications have occurred to management controller 112, and if modifications have occurred, take appropriate remedial action.

FIG. 2 illustrates a flow chart of a method 200 for creating status queues for processing domains of a management controller, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may power on or otherwise initialize. At step 204, management controller 112 may determine if the present boot of management controller 112 is its first factory boot. If the present boot is the first factory boot, method 200 may proceed to step 206. Otherwise, method 200 may proceed to step 208.

At step 206, during the first factory boot, management controller 112 may write POST codes generated by each of processor 113, trusted integrated processor 114, and co-processor 116, and timestamps associated with such POST codes, as processor domain status information for baseline queue 124 in memory map 122. After completion of step 206, method 200 may end.

At step 208, during a subsequent boot of management controller 112, management controller 112 may write POST codes generated by each of processor 113, trusted integrated processor 114, and co-processor 116, and timestamps associated with such POST codes, as processor domain status information for run-time queue 126 in memory map 122. After completion of step 208, method 200 may end, and management controller 112 may proceed to execute method 300 described below.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of a method 300 for analyzing status queues of processing domains of a management controller, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, management controller 112 may extract baseline queue 124 and run-time queue 126 from memory map 122. At step 304, management controller 112 may compare the POST code sequences of the processing domain status information stored in baseline queue 124 and run-time queue 126 and may also compare respective timestamps associated with POST code sequences of the processing domain status information stored in baseline queue 124 and run-time queue 126.

At step 306, management controller 112 may determine if a deviation exists between processing domain status information stored in baseline queue 124 and processing domain status information stored in run-time queue 126. For example, such a deviation may comprise one or more POST codes of run-time queue 126 differing from associated POST codes of baseline queue 124, indicating an alternate boot path was taken other than that taken during first factory boot. As another example, such a deviation may include a timestamp for a POST code of run-time queue 126 differing by more than an allowed tolerance (which may be user-configurable) than an associated timestamp for the POST code of baseline queue 124, which may indicate a modification to boot code in a processing domain of management controller 112. If a deviation exists, method 300 may proceed to 308. Otherwise, method 300 may end.

At step 308, management controller 112 may determine if the deviation is a user/administrator approved deviation. For example, a user/administrator of information handling system 102 may approve a deviation occurring as a result of an approved firmware update to management controller 112 and/or a hardware modification to information handling system 102. If the deviation is approved, method 300 may proceed to step 310. Otherwise, method 300 may proceed to step 312.

At step 310, responsive to a determination that a deviation is approved, management controller 112 may cause baseline queue 124 to be rewritten with new processing domain status information associated with the current boot processes of processor 113, trusted integrated processor 114, and co-processor 116, thus updating baseline queue 124 from its factory settings. After completion of step 310, method 300 may end.

At step 312, responsive to a determination that a deviation is not approved, management controller 112 may initiate a remedial action. Such remedial action may include any suitable action, including without limitation generation of an alert to a user/administrator (e.g., via a user interface of information handling system), an alert to other information handling systems communicatively coupled to information handling system 102, and/or disallowing completion of boot processes of management controller 112. After completion of step 312, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in FIGURE is and described above, the principles of the present disclosure may be implemented using any number of techniques, whether currently known or not. The present disclosure should in no way be limited to the exemplary implementations and techniques illustrated in FIGURE is and described above.

Unless otherwise specifically noted, articles depicted in FIGURE is are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a host system comprising a host system processor; and
a management controller communicatively coupled to the host system processor and comprising:
    a main management controller processor configured for implementing functionality of the management controller; and
    a second management controller processor communicatively coupled to the main management controller processor and configured for implementing additional functionality of the management controller;
wherein, the management controller is configured to:
    during a first initial boot of the management controller, write baseline processor domain status information associated with boot of each of the main management controller processor and the second management controller processor to a baseline queue; and
    during each subsequent boot of the management controller:
        write run-time processor domain status information associated with boot of each of the main management controller processor and the second management controller processor to a run-time queue;
        determine if a deviation exists between the run-time queue and the baseline queue; and
        responsive to the deviation existing between the run-time queue and the baseline queue, take one or more responsive actions.

2. The information handling system of claim 1, wherein the second management controller processor comprises a special-purpose processor used to supplement functionality of the main management controller processor.

3. The information handling system of claim 1, wherein the second management controller processor comprises a cryptoprocessor configured to provide secured boot services and run-time security functions of the management controller.

4. The information handling system of claim 1, wherein:
the management controller comprises a third processor;
the management controller is further configured to, during the first initial boot, write baseline processor domain status information associated with boot of each of the main management controller processor, the second management controller processor, and the third processor to the baseline queue;
the management controller is further configured to, during each subsequent boot, write run-time processor domain status information associated with boot of each of the main management controller processor, the second management controller processor, and the third processor to a run-time queue.

5. The information handling system of claim 4, wherein:
the second management controller processor comprises a special-purpose processor used to supplement functionality of the main management controller processor; and
the third processor comprises a cryptoprocessor configured to provide secured boot services and run-time security functions of the management controller.

6. The information handling system of claim 1, wherein each of the baseline processor domain status information and the run-time processor domain status information comprise:
power-on/self-test codes generated in connection with boot of the main management controller processor and the second management controller processor; and
timestamps generated in connection with the power-on/self-test codes.

7. The information handling system of claim 1, wherein the one or more responsive actions comprise:
determining if the deviation is approved by a user/administrator of the information handling system; and
rewriting the baseline processor domain status information with new processing domain status information associated with the current boot processes of the main management controller processor and the second management controller processor.

8. The information handling system of claim 1, wherein the one or more responsive actions comprise causing a remedial action to be performed responsive to the deviation.

9. A method, in an information handling system comprising a host system comprising a host system processor, the information handling system further comprising a management controller communicatively coupled to the host system processor and having a main management controller processor and configured for implementing functionality of the management controller and a second management controller processor communicatively coupled to the main management controller processor and configured for implementing additional functionality of the management controller, the method comprising:
  during a first initial boot of the management controller, writing baseline processor domain status information associated with boot of each of the main management controller processor and the second management controller processor to a baseline queue; and
  during each subsequent boot of the management controller:
    writing run-time processor domain status information associated with boot of each of the main management controller processor and the second management controller processor to a run-time queue;
    determining if a deviation exists between the run-time queue and the baseline queue; and
    responsive to the deviation existing between the run-time queue and the baseline queue, taking one or more responsive actions.

10. The method of claim 9, wherein the second management controller processor comprises a special-purpose processor used to supplement functionality of the main management controller processor.

11. The method of claim 9, wherein the second management controller processor comprises a cryptoprocessor configured to provide secured boot services and run-time security functions of the management controller.

12. The method of claim 9, wherein:
  the management controller comprises a third processor; and
  the method further comprises:
    during the first initial boot, writing baseline processor domain status information associated with boot of each of the main management controller processor, the second management controller processor, and the third processor to the baseline queue; and
    during each subsequent boot, writing run-time processor domain status information associated with boot of each of the main management controller processor, the second management controller processor, and the third processor to the run-time queue.

13. The method of claim 12, wherein:
  the second management controller processor comprises a special-purpose processor used to supplement functionality of the main management controller processor; and
  the third processor comprises a cryptoprocessor configured to provide secured boot services and run-time security functions of the management controller.

14. The method of claim 9, wherein each of the baseline processor domain status information and the run-time processor domain status comprise:
  power-on/self-test codes generated in connection with boot of the main management controller processor and the second management controller processor; and
  timestamps generated in connection with the power-on/self-test codes.

15. The method of claim 9, wherein the one or more responsive actions comprise:
  determining if the deviation is approved by a user/administrator of the information handling system; and
  rewriting the baseline processor domain status information with new processing domain status information associated with the current boot processes of the main management controller processor and the second management controller processor.

16. The method of claim 9, wherein the one or more responsive actions comprise causing a remedial action to be performed responsive to the deviation.

17. An article of manufacture comprising:
  a non-transitory computer-readable medium; and
  computer-executable instructions carried on the computer-readable medium, the instructions readable by a processing device, the instructions, when read and executed, for causing the processing device to, in an information handling system comprising a host system comprising a host system processor, the information handling system further comprising a management controller communicatively coupled to the host system processor and having a main management controller processor and configured for implementing functionality of the management controller and a second management controller processor communicatively coupled to the main management controller processor and configured for implementing additional functionality of the management controller:
    during a first initial boot of the management controller, write baseline processor domain status information associated with boot of each of the main management controller processor and the second management controller processor to a baseline queue; and
    during each subsequent boot of the management controller:
      write run-time processor domain status information associated with boot of each of the main management controller processor and the second management controller processor to a run-time queue;
      determine if a deviation exists between the run-time queue and the baseline queue; and
      responsive to the deviation existing between the run-time queue and the baseline queue, take one or more responsive actions.

18. The article of claim 17, wherein the second management controller processor comprises a special-purpose processor used to supplement functionality of the main management controller processor.

19. The article of claim 17, wherein the second management controller processor comprises a cryptoprocessor configured to provide secured boot services and run-time security functions of the management controller.

20. The article of claim 17, wherein:
  the management controller comprises a third processor; and
  the instructions further cause the processing device to:
    during the first initial boot, write baseline processor domain status information associated with boot of each of the main management controller processor, the second management controller processor, and the third processor to the baseline queue; and
    during each subsequent boot, write run-time processor domain status information associated with boot of each of the main management controller processor, the second management controller processor, and the third processor to the run-time queue.

21. The article of claim 20, wherein:
the second management controller processor comprises a special-purpose processor used to supplement functionality of the main management controller processor; and
the third processor comprises a cryptoprocessor configured to provide secured boot services and run-time security functions of the management controller.

22. The article of claim 17, wherein each of the baseline processor domain status information and the run-time processor domain status comprise:
power-on/self-test codes generated in connection with boot of the main management controller processor and the second management controller processor; and
timestamps generated in connection with the power-on/self-test codes.

23. The article of claim 17, wherein the one or more responsive actions comprise:
determining if the deviation is approved by a user/administrator of the information handling system; and
rewriting the baseline processor domain status information with new processing domain status information associated with the current boot processes of the main management controller processor and the second management controller processor.

24. The article of claim 17, wherein the one or more responsive actions comprise causing a remedial action to be performed responsive to the deviation.

* * * * *